Patented July 12, 1938

2,123,493

UNITED STATES PATENT OFFICE 2,123,493

CELLULOSIC STRUCTURE AND METHOD OF PREPARING SAME

Francis P. Alles, Buffalo, N. Y., assignor, by mesne assignments, to E. I. du Pont de Nemours & Company, Wilmington, Del., a corporation of Delaware No Drawing. Application December 18, 1934, Serial No. 758,094

17 Claims. (Cl. 18—54)

This invention relates to new cellulose derivatives and to the method whereby they may be obtained. It relates also to cellulosic structures of pellicular or filamentary nature, including sheets or films, tubes, caps, artificial straws, threads, et cetera, such as may be cast, extruded, spun or otherwise made from the new cellulose derivatives. It relates particularly to pellicles of cellulose xanthate-aldehyde and to means for preparing the same.

Heretofore, cellulose structures have been made by casting, for example, from solutions of cellulose derivatives, such as cellulose esters or ethers, or from dispersions such as viscose in which case the final product is a regenerated cellulose. In the manufacture of pellicles of regenerated cellulose by the viscose process, the cellulose is converted to cellulose xanthate by several well known steps. The cellulose xanthate is dispersed in an aqueous alkaline medium to form what is known as viscose which latter may be introduced in the desired form into a coagulating and/or regenerating bath. In any event, the cellulose xanthate is finally decomposed to yield regenerated cellulose and in this form the pellicle or other structure is subjected to a series of purifying baths including a desulfuring bath which removes inter alia the small amounts of free sulfur liberated by the decomposition of the xanthate, and a bleaching bath which is designed to eliminate the last traces of impurity or color. The pellicle is thereafter washed thoroughly, treated with a softener and dried to the desired moisture content.

It has now been found that stable cellulose derivative pellicles or the like can be obtained from viscose which, in contradistinction to regenerated cellulose, require no purification treatments beyond the simple washing with water. These derivatives are capable of yielding clear, transparent, colorless, tough, flexible pellicles which exhibit remarkable insensitivity to moisture, stability towards acid and excellent dielectric properties.

It is an object of this invention to produce a new cellulose derivative.

It is another object of the invention to produce a new cellulose derivative capable of forming cellulosic structures of pellicular or filamentary nature.

It is another object of this invention to produce clear, transparent, tough, flexible cellulosic pellicles which will be relatively insensitive to moisture, stable towards acids and possessed of high dielectric properties.

It is specifically the object of the invention to produce cellulose xanthate-aldehyde pellicles suitable for use as wrapping tissues or filaments suitable for textile purposes.

Other objects of the invention will be apparent from the following detailed description.

Generally speaking, the objects of the invention are attained by treating cellulose xanthate with an aldehyde to produce a reaction product of cellulose xanthate and an aldehyde. This reaction product between cellulose xanthate and an aldehyde will, for convenience, be hereinafter referred to as "cellulose xanthate-aldehyde." The cellulose xanthate is provided, for the purposes of the invention, by the coagulation of the aqueous alkaline dispersion of sodium cellulose xanthate commonly known as viscose. The viscose is introduced into a coagulating but not regenerating bath whereby it is converted to the coagulated cellulose xanthate, which latter is treated with an aldehyde to yield the desired cellulose xanthate-aldehyde which may in turn be washed, softened, dried and finally collected in the ultimate pellicular or filamentary form.

For convenience, the invention will be described in its application to the manufacture of sheets or films of cellulose xanthate-aldehyde but it is to be understood that the invention is not limited thereto since tubes, caps, artificial straw, filaments, etc. can be produced in accordance with the principles of the invention.

In accordance with the invention, as applied to the manufacture of sheets or films, viscose is continuously passed through a suitable hopper and extruded through an adjustable slit-like orifice therein, in the manner customarily employed in the continuous manufacture of pellicles of regenerated cellulose. The viscose is extruded into a coagulating but not regenerating bath which bath may be composed, conveniently, of an aqueous salt solution such as an aqueous ammonium sulfate solution. Upon coming into contact with the coagulating bath, the extruded viscose is coagulated into a pellicle of essentially sodium cellulose xanthate and this pellicle is led out of the coagulating bath, as, for example, by suitable guide rolls, into a washing bath which latter contains enough electrolyte, preferably a salt, to prevent the disintegration or re-dispersion of the sodium cellulose xanthate pellicle. After the washing operation, the pellicle is led into an aqueous bath containing an aldehyde, such as formaldehyde, and preferably also a coagulant, as, for example, acetic acid. After the aldehyde treatment the pellicle, which now consists of a cellulose xanthate-aldehyde, is washed in cold water until free of all water soluble materials, whereupon it may be passed through a bath containing a softener, as, for example, an aqueous diacetin bath, and when the excess bath has been removed, as by suitable squeeze rolls, the pellicle may be passed over a series of heated drier rolls until the moisture content has been reduced to the proper degree, when the pellicle may be collected in the form of a roll suitable for further handling, such as slitting, cutting, coating, or the like, preparatory for transmittal to consumers.

In the practice of the invention, any viscose of any degree of ripeness may be employed so long as it is capable of being properly extruded. It has been found, however, that a relatively green viscose, i. e. a viscose having a relatively high salt index such as 8—9 or higher as measured by the sodium chloride method, may be used where it is desirable to have the viscose more reactive towards the aldehyde treatment. It is well known that during the process of ripening, the sodium cellulose xanthate in the viscose tends to increase in molecular aggregation with elimination of the xanthate complex. Since the aldehyde reaction seems to be dependent on the presence of the xanthate portion, it is apparent that in many cases a relatively green viscose containing a comparatively large proportion of xanthate complex will be of greater utility than a ripe viscose which is relatively poor in xanthate content. Highly satisfactory results are obtained, however, with a viscose having a sodium chloride salt index of 2—5, although these values are not to be considered as limitative.

Any suitable coagulating but not regenerating bath may be used including those customarily employed in the manufacture of regenerated cellulose pellicles. Thus, an aqueous bath containing about 14–18% ammonium sulfate is particularly useful although other baths containing sodium chloride, sodium sulfate, dilute acetic acid or the like may be used. In the case of ammonium sulfate, it is generally advisable to avoid appreciable amounts of free ammonia in the bath.

The washing of the coagulated pellicle is accomplished by passing the pellicle through one or more dilute aqueous salt solutions where the salt is present in sufficient quantity to prevent the redispersion of the coagulated pellicle. Baths containing 3–20% of such salts as sodium chloride, sodium sulfate, ammonium sulfate or the like will be found useful although from the standpoint of economy, the bath of lowest salt concentration which will still operate satisfactorily is to be preferred. Thus, a solution of 5–6% ammonium sulfate or 3–4% sodium chloride will be of particular advantage. It is the purpose of the washing bath to remove the sodium hydroxide which is available from the original viscose as well as any other water-soluble materials such as sulfur complexes or other by-products of the viscose ripening process. It is important that the washing be continued until the pellicle is substantially free of excess alkali such as sodium hydroxide because the presence of alkali may be harmful to the cellulose xanthate-aldehyde pellicle as subsequently produced.

Various products are possible of production through the choice of aldehyde. Good results are obtained with formaldehyde, but other aldehydes such as acrylic aldehyde, crotonic aldehyde or the like may be used successfully. Usually, aliphatic aldehydes are to be preferred because of their greater reactivity although aromatic aldehydes such as benzaldehyde may also be used. Unsaturated aliphatic aldehydes such as acrylic aldehyde seem to be more reactive than saturated aldehydes, but formaldehyde is most generally useful and produces a highly satisfactory cellulose xanthate-aldehyde reaction product.

The aldehyde reaction may be carried out in either acid or slightly alkaline media although appreciable amounts of alkali are to be avoided. With formaldehyde the reaction will take place in about a half minute if the aldehyde concentration is about 1%. Generally speaking, the aldehyde concentration may vary from 0.5–40% or more, but usually 1–10% will be found to be economically practical. Usually, the reaction is favored by the presence of a coagulant, especially acids such as acetic acid, sulfuric acid or the like. Thus, in the use of crotonic aldehyde, the presence of a small amount, for example, 0.25% sulfuric acid, has been found particularly advantageous. The acid also serves to prevent redispersion of the cellulose xanthate-aldehyde.

In some instances, as, for example, in the case of acrylic aldehyde, the marked reactivity of the aldehyde tends to produce rather brittle products instead of the tough leathery product obtained with formaldehyde. In such cases it is possible to remedy the difficulty by reducing the reactive capacity of the cellulose xanthate. This can be done in several ways. Thus, for example, the addition of a suitable quantity (0.1–2%) of sulfuric acid to the aldehyde bath and suitable variation of the ratio of such acid to aldehyde (0.2–1% acrylic aldehyde) will enable a certain amount of regeneration to take place simultaneously with the aldehyde reaction. This will automatically reduce the degree of aldehyde reaction and will result in the production of a flexible material of reduced moisture sensitivity as compared to a product composed entirely of regenerated cellulose. On the other hand, the production of brittle products may be overcome by decreasing the activity of the cellulose xanthate by control of the degree of xanthation. Thus, if a cellulose xanthate produced by the use of a low carbon bisulfide ratio is dispersed in alkali at low temperatures and subsequently coagulated and reacted with acrylic aldehyde, the product will be more flexible since the aldehyde reaction has been restricted by the smaller proportion of xanthate complex in the cellulose xanthate.

Usually, the addition of a softener to the cellulosic pellicle is advantageous to improve flexibility and for this purpose such materials as formamide, monoacetin, diacetin, triacetin, glycerol, glycols, polyglycerols or polyglycols, or the like, may be used. In some cases the presence of a softener tends to cause hydrolysis or breakdown of the cellulose xanthate-aldehyde with consequent increase in the moisture sensitivity. This can be overcome by including a stabilizing agent in the softener bath. As stabilizing agents, sulfuric acid or boric acid have been found to serve well. Some softeners exert a stabilizing action of their own, as, for example, the glycerol esters of acetic acid, with which it has been found that as the degree of esterification is increased from monoacetin to triacetin, the stabilizing action also increases.

As illustrative of the practice of this invention, the following specific example is given, it being understood that it is not to be considered as limitative of the scope of the invention.

A layer of viscose having a salt index of 4 (sodium chloride scale) is cast on a smooth glass plate and then immersed in a coagulating bath consisting of a 15% aqueous solution of ammonium sulfate at a temperature of 40° C. When the sodium cellulose xanthate has been completely coagulated, it is stripped from the glass plate as a self-sustaining pellicle and transferred, after drainage of excess coagulating bath, to an aldehyde bath consisting of a 5% aqueous solution of formaldehyde. The reaction of the cellulose xanthate pellicle with the formaldehyde is completed in a short time, 30-40 seconds, whereupon the pellicle is removed from the bath and washed thoroughly with cold water. The pellicle is then immersed in a 4% aqueous formamide solution (softener bath) for several seconds or long enough for the interchange between the water in the pellicle and the softener bath to reach equilibrium. Sufficient formamide is thus introduced into the pellicle to provide 14-15% formamide in the final dry product. When the excess softener bath has been removed as by scraper rods, squeeze rolls or the like, the pellicle is dried in an oven at about 75° C. until the moisture content has been reduced to about 7% based on the weight of cellulose in the pellicle. The final product is about 0.001" in thickness, is clear, soft, transparent, colorless, flexible, tough and comparatively moisture insensitive showing a deformation of about 2%. A commercially obtainable pellicle of regenerated cellulose softened with glycerol is susceptible to changes in dimension with increase or decrease in moisture content which frequently amounts to as much as 4-10%. This is usually referred to as the deformation.

It is to be noted in the above example that the washing treatment between the coagulating bath and aldehyde bath has been omitted. This is permissible when a large volume of coagulating bath liquor is used in proportion to the amount of viscose to be coagulated. The coagulating bath may then serve also as a wash bath to remove the excess alkali in the viscose. In the case of continuous production where the viscose is extruded into the coagulating bath and the coagulated pellicle is drawn rapidly and continuously through the bath, it is desirable and preferable that one or more wash baths be provided as heretofore described in the specification.

If desired, the products of this invention, particularly those of pellicular nature, may be provided with one or more surface coatings to produce coated materials having utility in numerous ways. Thus, for example, a sheet or film of cellulose xanthate-aldehyde may be provided with a coating of lacquer, varnish or the like, which coating may be familiar to the coating arts. If a moistureproofing coating is applied, the product will be moistureproof in addition to retaining its normal characteristics of transparency, flexibility, toughness, etc. Suitable moistureproofing compositions may include compositions comprising a cellulose derivative, such as cellulose nitrate, and a moistureproofing agent, such as paraffin wax, with or without the addition of resins, blending agents, plasticizers, or the like. Other compositions comprising a moistureproofing agent and film forming constituents such as resins, natural or synthetic, rubber, rubber derivatives, or the like, and with or without blending agents, plasticizers, cellulose derivatives, et cetera, may be used if desired. Where transparency is not desired, it is possible to use coating compositions which are pigmented and/or colored and obviously a clear colored coating may be applied where a transparent but colored product is desired.

As normally prepared, pellicles or filaments of the type described will be transparent and colorless. It is within the purview of the invention, however, to produce opaque or colored materials where desired. Thus, pigments, fillers, mica, fibers, dyes, or the like, may be incorporated in the viscose prior to its extrusion or in the case of colored material, the structures may be dyed at any time during the course of their manufacture.

The products obtainable according to the present invention and particularly sheets or films of cellulose xanthate-formaldehyde are clear, colorless, transparent, tough, flexible pellicles of remarkably low moisture sensitivity. Treatment of cellulose xanthate-formaldehyde with cold water for even considerable periods of time seems to have little or no effect, but, treatment of freshly prepared material with hot water at about 70° C. will result in a reversion to a cellulosic dispersion. Acids, such as 10% sulfuric acid, even at comparatively high temperatures (70° C.) have no effect on the product although alkalies are capable of causing reversion of freshly prepared material to a cellulosic dispersion.

Unsoftened pellicles of cellulose xanthate-formaldehyde are remarkably insensitive to moisture as compared to regenerated cellulose. The unsoftened cellulose xanthate-formaldehyde pellicle, while still flexible and tough will deform only about 1.5%. As noted above, the sensitivity to moisture is increased if a softener is used, but if a stabilizing agent is also employed, the deformation can be maintained as low as 2%.

An outstanding characteristic of the cellulose xanthate-aldehyde pellicles is their remarkable dielectric properties. Thus, for example, a pellicle of cellulose xanthate-formaldehyde will show a power factor of about 1.1 and a dielectric constant of about 4.2. Furthermore, a similar pellicle softened with formamide shows an electrical breakdown of about 3400-4200 volts per mil. (thousandth of an inch) of thickness. Unsoftened regenerated cellulose pellicles, which are greatly superior to ordinary softened, regenerated cellulose pellicles, show an electrical breakdown of about 2,000 volts per mil.

The process of the invention is particularly advantageous since it enables the production of cellulosic structures of pellicular or filamentary nature without the necessity for desulfuring and bleaching as customarily required in the manufacture of such cellulosic pellicles as regenerated cellulose pellicles. In the manufacture of clear, transparent, colorless, tough and flexible pellicles, for example, by the present process it is only necessary to wash the cellulose xanthate-aldehyde pellicle to remove excess aldehyde, whereupon the pellicle may be treated with a softener if desired and then dried.

In contradistinction to the production of regenerated cellulose pellicles, the process is not limited to the manufacture of very thin pellicles but it may be used to produce with comparative ease, pellicles having a thickness of several thousandths of an inch. Thus, a pellicle having a thickness of .003-.004" may be obtained directly, whereas it is possible to obtain satisfactory regenerated cellulose pellicles of comparable thickness only by laminating two or more thinner pellicles.

The products of the invention are particularly useful, especially when in pellicular form. As wrapping tissues, sheets or films of cellulose xanthate-aldehyde find particular use because of their transparency, lack of color, toughness and flexibility as well as their property of remaining relatively insensitive to moisture. This last mentioned property permits use in the fabrication of window envelopes, window cartons and the like where sensitivity to moisture causes wrinkling, buckling or other distortion. The dielectric properties of these pellicles enables their use to great advantage where electrical insulation is desired and the high electrical breakdown makes them especially useful in the manufacture of electrical condensers.

Textiles prepared from filaments or threads of cellulose xanthate-aldehyde, especially cellulose xanthate-formaldehyde, offer unique possibilities in the production of various mixed fabrics where it is desired eventually to eliminate one of the textile threads. The cellulose xanthate-aldehyde threads, when freshly prepared, for example, are susceptible to solution in alkaline media and therefore a mixed fabric, comprising threads of this material, when subjected to treatment with a warm, strong soap solution or weak sodium hydroxide solution, would be freed of the cellulose xanthate-aldehyde threads leaving the remaining textile threads, such as cotton, silk, rayon, or the like, unharmed and unaffected. Thus, for example, a fabric might be woven of freshly prepared cellulose-xanthate-formaldehyde threads and used as a base for decorative embroidery or lace work, after which the base could be dissolved away in the manner indicated leaving the lace as a self-sustaining entity. Other uses for fabrics of this type will be apparent to those skilled in the art.

Obviously, various changes and modifications may be made in the above-described invention without departing from the nature and spirit thereof. It is therefore to be understood that the invention is not to be limited thereto except as set forth in the appended claims.

I claim:

1. A non-fibrous, flexible, purified, dried cellulosic article of manufacture comprising essentially a reaction product of cellulose xanthate and an aldehyde.

2. A non-fibrous, flexible, purified, dried cellulosic article comprising essentially a reaction product of cellulose xanthate and a saturated aliphatic aldehyde.

3. A non-fibrous, flexible, purified, dried cellulosic article comprising essentially a reaction product of cellulose xanthate and an unsaturated aliphatic aldehyde.

4. A non-fibrous, flexible, purified, dried cellulosic article comprising essentially a reaction product of cellulose xanthate and formaldehyde.

5. A non-fibrous, flexible, purified, dried cellulosic article comprising essentially a reaction product of cellulose xanthate and acrylic aldehyde.

6. A non-fibrous, flexible, purified, dried cellulosic article comprising essentially a reaction product of cellulose xanthate and an aromatic aldehyde.

7. A non-fibrous, flexible, purified, dried cellulosic article comprising essentially a reaction product of cellulose xanthate and benzaldehyde.

8. A non-fibrous, flexible, purified, dried cellulosic pellicle suitable for use as a wrapping tissue comprising essentially a reaction product of cellulose xanthate and an aldehyde.

9. The method of making a cellulose derivative pellicle which comprises extruding a cellulose xanthate solution into a coagulating, non-regenerating bath and treating said coagulated, unregenerated pellicle with an aldehyde to form a cellulose xanthate-aldehyde pellicle, and purifying and drying said cellulose xanthate-aldehyde pellicle.

10. The method of making a cellulose derivative pellicle which comprises forming a cellulose xanthate structure by coagulating the same while maintaining the same unregenerated and treating said formed cellulose xanthate structure with an aldehyde to form a cellulose xanthate-aldehyde pellicle, and purifying and drying said cellulose xanthate-aldehyde pellicle.

11. The method of making a cellulose derivative pellicle which comprises forming a cellulose xanthate structure by coagulating the same while maintaining the same unregenerated and treating said formed cellulose xanthate structure with formaldehyde to form a cellulose xanthate-aldehyde pellicle, and purifying and drying said cellulose xanthate-aldehyde pellicle.

12. The method of making a cellulose derivative article which comprises forming a coagulated, unregenerated cellulose xanthate article, reacting the same with an aldehyde to convert it to cellulose xanthate-aldehyde, and purifying and drying said cellulose xanthate-aldehyde article.

13. The method of making a cellulose derivative article which comprises forming a coagulated, unregenerated cellulose xanthate article, reacting the same with an aliphatic aldehyde to convert it to cellulose xanthate-aldehyde, and purifying and drying said cellulose xanthate-aldehyde article.

14. The method of making a cellulose derivative article which comprises forming a coagulated, unregenerated cellulose xanthate article, reacting the same with formaldehyde to convert it to cellulose xanthate-aldehyde, and purifying and drying said cellulose xanthate-aldehyde article.

15. The method of making a cellulose derivative article which comprises forming, in a coagulating, non-regenerating bath, a coagulated unregenerated cellulose xanthate article, passing said formed article into a second bath containing a solution of an aldehyde to convert it to cellulose xanthate-aldehyde, and purifying and drying said cellulose xanthate-aldehyde article.

16. The method of making a cellulose derivative article which comprises forming a coagulated, unregenerated cellulose xanthate article, reacting the same with acrylic aldehyde to convert it to a cellulose xanthate-aldehyde and purifying and drying said cellulose xanthate-aldehyde article.

17. The method of making a cellulose derivative article which comprises forming a coagulated, unregenerated cellulose xanthate article, reacting the same with benzaldehyde to convert it to a cellulose xanthate-aldehyde and purifying and drying said cellulose xanthate-aldehyde article.

FRANCIS P. ALLES.